UNITED STATES PATENT OFFICE.

PIERRE NOLF, OF LIEGE, BELGIUM.

PROCESS OF CONVERTING YEAST INTO FOOD.

1,012,147.  Specification of Letters Patent.  Patented Dec. 19, 1911.

No Drawing.  Application filed May 31, 1911. Serial No. 630,459.

*To all whom it may concern:*

Be it known that I, PIERRE NOLF, a subject of the Kingdom of Belgium, residing at 12 Quai de la Boverie, Liege, in the Kingdom of Belgium, have invented certain new and useful Improvements in Processes for Converting Yeasts into Food, of which the following is a specification.

The present invention relates to a process enabling the nitrogenous substance of yeast to be converted into an alimentary product for human and animal consumption. Numerous processes have already been suggested for obtaining this result but they all present the defect either of necessitating the employment of various chemical agents or else they convert only a portion of the nitrogenous substances into an alimentary product or the product furnished by them is not pleasant to the taste or in appearance. These three essential defects are obviated by the process forming the object of the present application.

This process comprises two operations, a first operation during which the nitrogenous materials contained in the yeast cellules are dissolved, a second operation serving to free the extract of yeast obtained by the first operation from the bitter substances that it may contain. The first operation consists broadly in a sufficiently prolonged heating to 45 to 60° of the yeast to which water has been added. The heating of the compressed yeast invariably converts it into fluid but this conversion into fluid is due to different causes according to the temperature at which the operation is carried out. If the heating is carried beyond 80° the albumins of the yeast coagulate and the liquid obtained contains the extractive substances of the yeast mixed with a small quantity of peptone. This is an actual yeast bouillon. Between 65° and 80° there is a combination of the autolysis and of the coagulation. If the temperature is less than 65°, the fluidification is due to quite a different phenomenon. In these conditions under the influence of the enzymes contained in the yeast cellules a hydrolysis of all the proteic and hydrocarbonated reserves of the yeast takes place; this hydrolysis converts these substances into products of smaller molecular size. This hydrolysis is termed the autolysis of the yeast. As regards the proteic substances sufficiently prolonged autolysis converts the insoluble albumins in succession into soluble albumins, albumoses, peptones and finally into various crystalloid substances which can all be comprised under the generic name of abiuretic substances. When the autolysis is complete the whole of the nitrogenous material of the yeast is finally in the state of abiuretic substances. These premises having been established it is desirable to ascertain the rules that should govern the preparation of a good extract of yeast. As far as possible this extract should contain the whole of the alimentary nitrogen of the yeast. This nitrogen should not have lost anything of its alimentary value. The product should present a pleasant flavor.

Now it can readily be established that the albumins, albumoses and peptones of yeast are bitter in taste. It is also known that the abiuretic substances possess as much alimentary value as the weight of albumin from which they are obtained by hydrolysis. It follows that in order to extract the alimentary nitrogen from the yeast and to impart an agreeable taste to it the object to be aimed at is completely to convert the proteic reserves of the yeast into abiuretic substances. This conversion can be effected by simple autolysis without the addition of any chemical reagent. Autolysis is therefore the preferred method of preparing an extract of yeast. Autolysis takes place every time the yeast mixed with water is kept for some time at a temperature below 70 to 80°. This autolysis will take place more or less rapidly, however, according to the conditions in which the operation is carried out.

If the speed of autolysis at different temperatures be determined as has been done by the inventor, it is found that it is relatively low between 30 and 40° C. that it increases at higher temperatures attaining the maximum between 45 and 60° and decreases at higher temperatures by the destruction of the proteolytic enzymes. In order to obtain the maximum speed of conversion it is therefore necessary to operate at a temperature of from 45 to 60° which presents the secondary advantage of preventing the liquid from becoming contaminated by the atmospheric germs.

The criterion by which it is recognized that the operation is finished is not the state of fluidity of the liquid but the total conversion into abiuretic substances or in other words the complete or almost complete disappearance of the albumoses and peptones.

When compressed yeast is heated to 45 to 60° it is completely fluidified in one or two hours but the autolysis is far from being completed; it is only just beginning. At this moment the alimentary nitrogen of the yeast is rendered soluble but for the greater part it is in the condition of albumins, albumoses and peptones. The autolysis will only be terminated after the conversion of these substances into abiuretic substances. When the aeration is not vigorous about three weeks are required for the autolysis to reach this stage but with the supply of an adequate quantity of oxygen three days would suffice.

The vigorous aeration of the liquid that can be obtained either by spreading the liquid out in a shallow form in contact with the atmosphere or by passing a current of air or oxygen through the liquid mass or by any other means (specially by means of an oxidant) serving to introduce oxygen in favorable quantities and at suitable tension greatly hastens the autolysis. In these conditions it approaches its completion after remaining for about three days at the temperature of from 45 to 60°.

From the foregoing considerations it follows that the process of conversion proper of the nitrogenous substances of the yeast which forms the object of the first of the operations constituting the process forming the object of the present invention is obtained as follows. The yeast is mixed with water having a temperature of from 45 to 60°. The mixture is maintained at this temperature for the sufficient time (usually two to three days) while being provided by any convenient means with an adequate quantity of oxygen. The operation is stopped when analysis of a test sample indicates that the peptones have almost entirely disappeared. The extract of yeast thus obtained is then subjected to a supplementary preparation with the object of separating the bitter soluble substances that it may still contain. With this object the autolysis liquid is first of all filtered to free it from the insoluble substances (envelops of the yeast cellules, etc.) that it holds in suspension. At this moment the completely clear liquid is slightly bitter, this bitterness being imparted to it by the resins of the hops and by traces of peptone that it may still contain. In order to free it from these unpleasantly tasting substances it is subjected to a fining process. This fining may be produced by the hot coagulation of a coagulable albuminoid substance that has previously been introduced into the liquid or by the production on this liquid of a precipitate (carbonate, calcic, phosphate, etc.) obtained by the successive addition of non-toxic salts (calcic chlorid and carbonate of soda, calcic chlorid and phosphate of soda, etc.) or by any other analogous means. The filtered liquid is free from any trace of bitterness. The fining therefore does not serve for clarifying a liquid which was already clear but for eliminating certain dissolved substances which imparted an unpleasant flavor.

What I claim and desire to secure by Letters Patent of the United States is:—

1. A process for the conversion of the nitrogenous substances of yeast into comestibles consisting in maintaining this yeast at a suitable temperature insuring autolysis until the peptones have disappeared practically completely.

2. A process for the conversion of the nitrogenous substances of yeast into comestibles consisting in maintaining this yeast at a temperature comprised between 45 and 60° C., until the peptones have disappeared practically completely.

3. A process for the conversion of the nitrogenous substances of yeast into comestibles consisting in maintaining this yeast at a suitable temperature insuring autolysis while introducing oxygen until the peptones have disappeared practically completely.

4. A process for the conversion of the nitrogenous substances of yeast into comestibles consisting in maintaining this yeast at an appropriate temperature insuring autolysis until the peptones have practically completely disappeared and in then submitting the solution obtained to a fining operation serving to eliminate the bitter substances dissolved in the said solution.

5. A process for the conversion of the nitrogenous substances of yeast into comestibles consisting in maintaining this yeast at a suitable temperature insuring autolysis until it is found that the peptones have practically completely disappeared and in then subjecting the solution obtained to the action of neutral non-toxic salts in order to eliminate by fining the bitter substances dissolved in the said solution.

In testimony that I claim the foregoing as my invention, I have signed my name in presence of two subscribing witnesses.

PIERRE NOLF.

Witnesses:
 GEORGES VÜNDER HAEYHEN,
 LEONARD LÉVO.